United States Patent [19]

Turcotte et al.

[11] 4,093,854
[45] June 6, 1978

[54] WELL LOGGING SONDE INCLUDING A LINEAR PARTICLE ACCELERATOR

[75] Inventors: Ronald E. Turcotte; John S. Wahl, both of Ridgefield, Conn.

[73] Assignee: Schlumberger Technology Corporation, New York, N.Y.

[21] Appl. No.: 742,403

[22] Filed: Nov. 16, 1976

Related U.S. Application Data

[63] Continuation of Ser. No. 580,071, May 22, 1975, abandoned.

[51] Int. Cl.² ............................................... G01V 5/00
[52] U.S. Cl. ................................... 250/269; 250/270; 250/494; 250/502
[58] Field of Search ............... 250/270, 269, 502, 494; 328/233

[56] References Cited

U.S. PATENT DOCUMENTS

| | | | |
|---|---|---|---|
| 2,769,096 | 10/1956 | Frey | 250/269 |
| 2,902,613 | 9/1959 | Baldwin | 250/269 |
| 3,015,030 | 12/1961 | Jones | 250/269 |
| 3,546,524 | 12/1970 | Stark | 328/233 |

Primary Examiner—Harold A. Dixon

[57] ABSTRACT

In accordance with an illustrative embodiment of the present invention, a logging sonde includes a standing wave type microwave linear particle accelerator excited by a magnetron and producing bursts of high energy electrons which can selectively bombard either a neutron emitting target or a photon emitting target. Means are provided to sense the variations in the amplitude of the microwave field in the linear accelerator and to control the frequency of the magnetron so as to maintain the amplitude of the accelerating field at a reference value representative of the expected maximum amplitude value at resonance. Means are also provided to sense the variations in the temperature of the linear accelerator and to control the frequency of the magnetron so as to compensate for the variations in the resonant frequency of the accelerator that result from temperature induced changes the length thereof.

26 Claims, 8 Drawing Figures

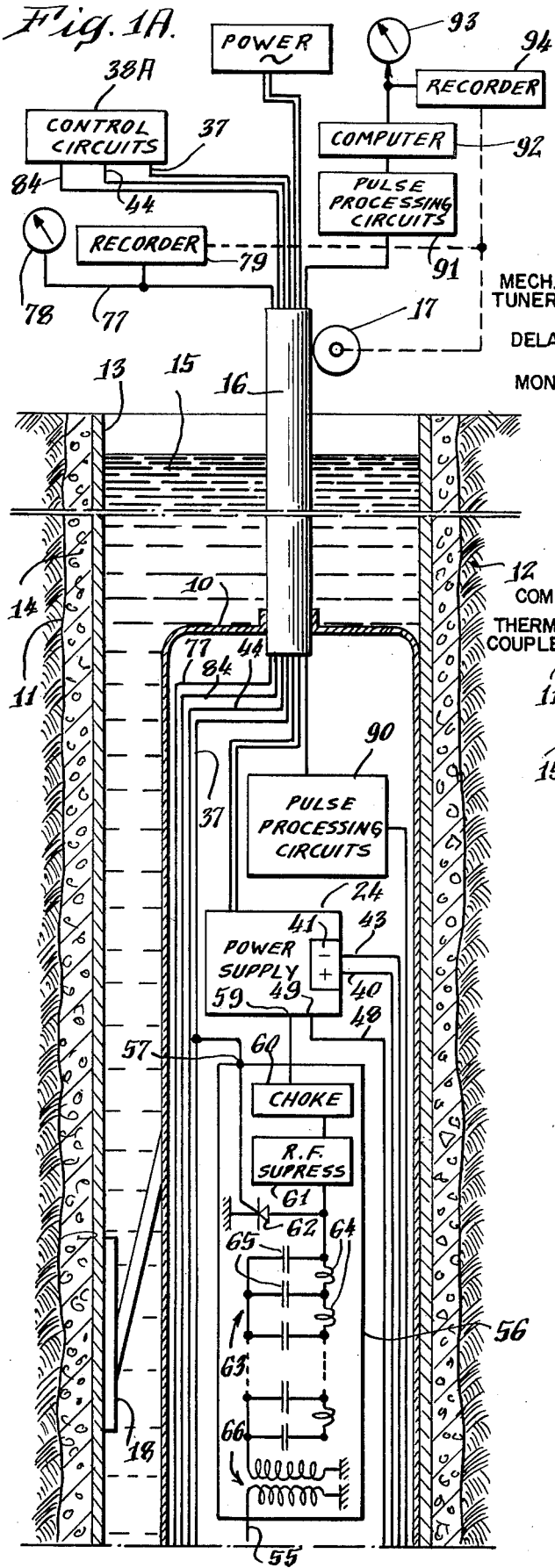
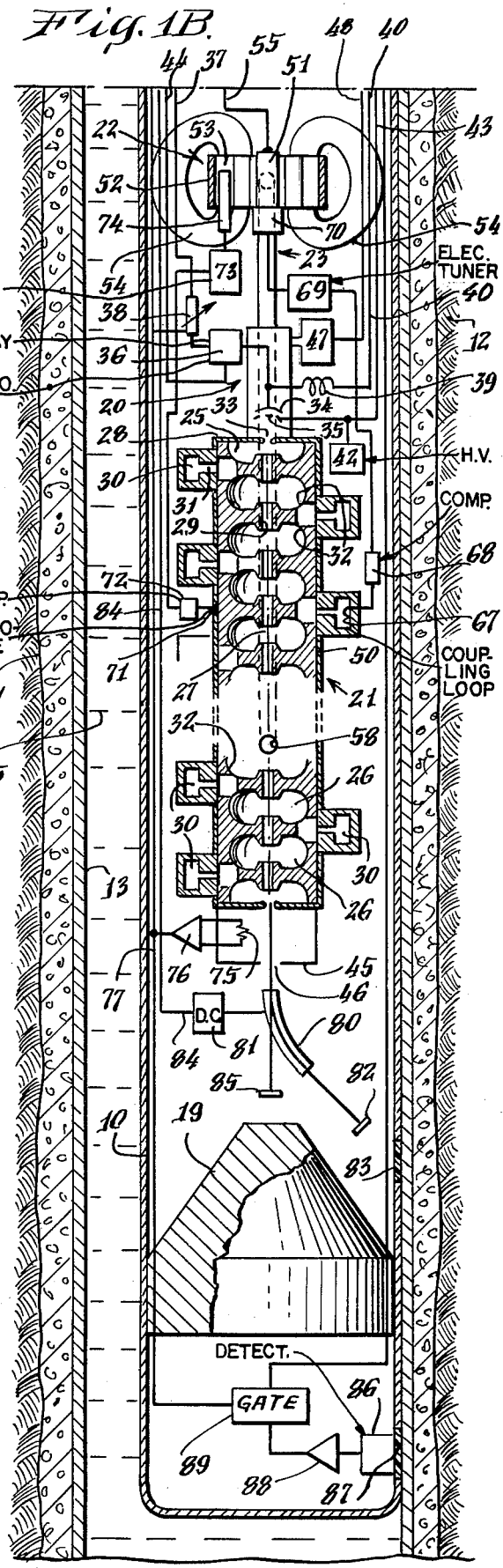

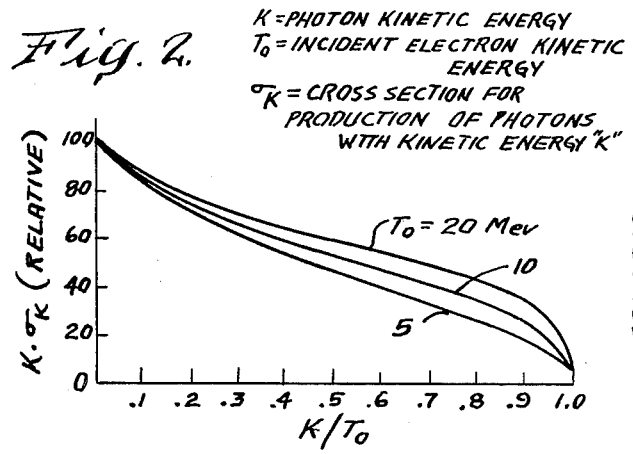
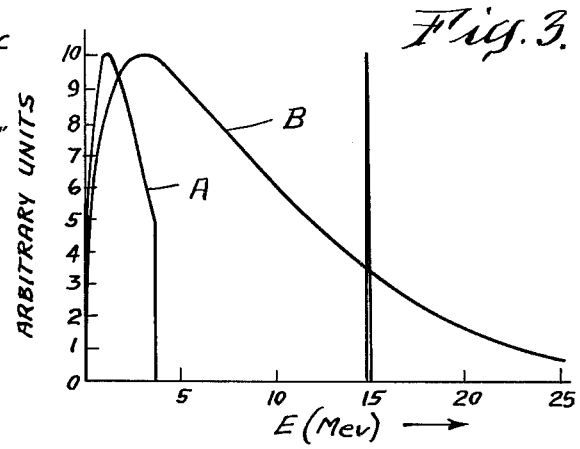
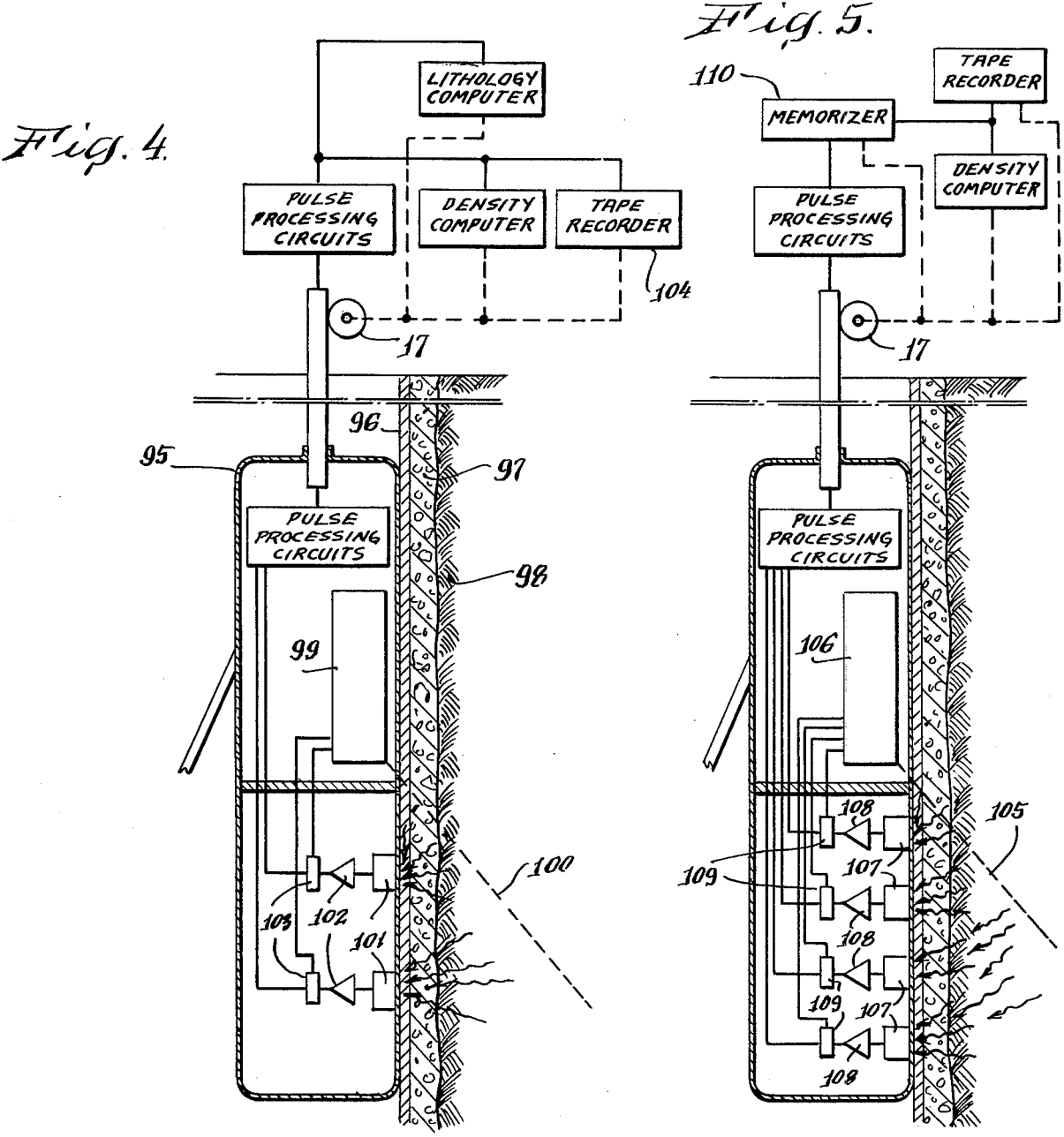

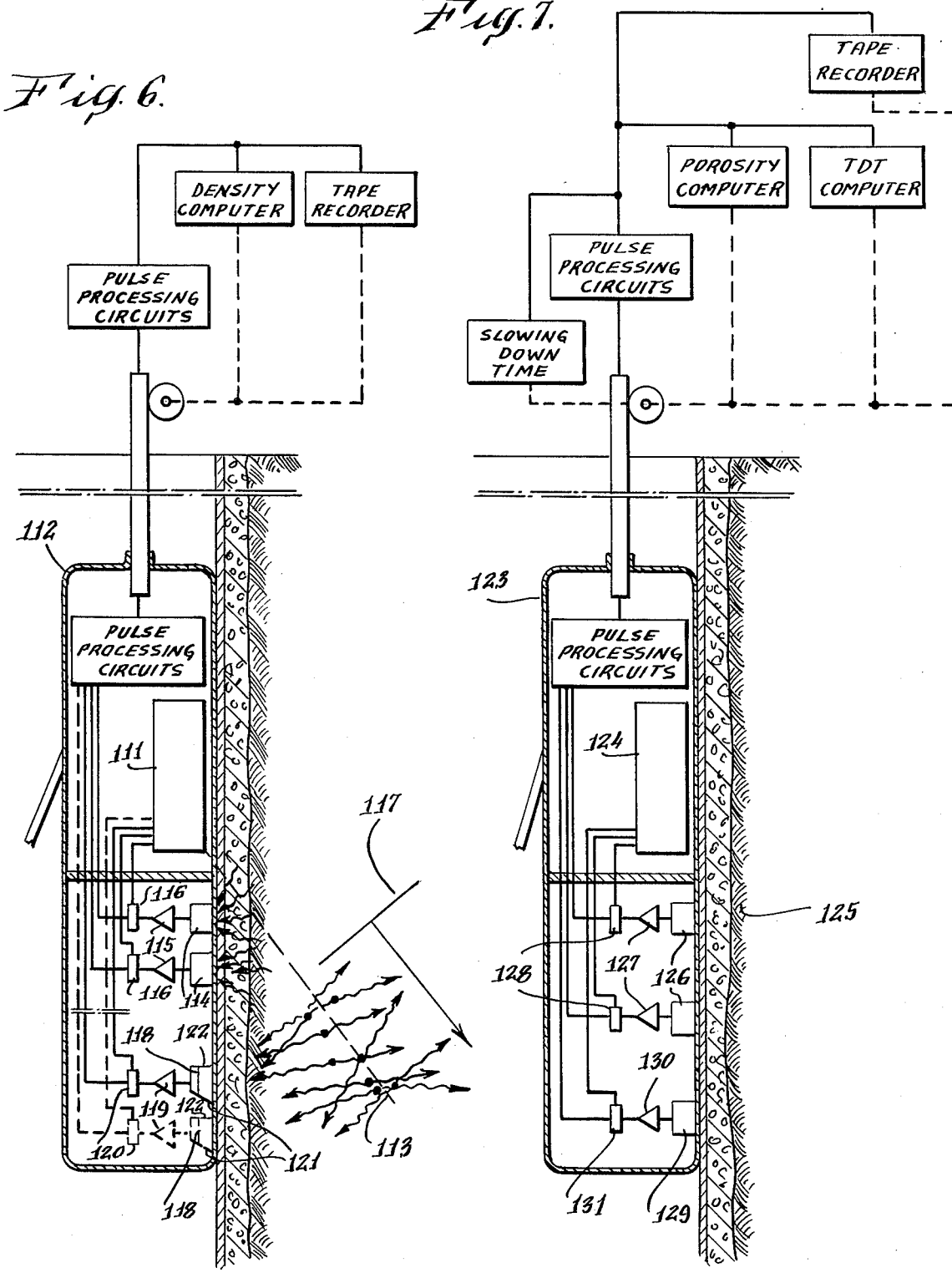

WELL LOGGING SONDE INCLUDING A LINEAR PARTICLE ACCELERATOR

BACKGROUND OF THE INVENTION

In accordance with an illustrative embodiment of the present invention, a logging sonde includes a standing wave type microwave linear particle accelerator excited by a magnetron and producing bursts of high energy electrons which can selectively bombard either a neutron emitting target or a photon emitting target. Means are provided to sense the variations in the amplitude of the microwave field in the linear accelerator and to control the frequency of the magnetron so as to maintain the amplitude of the accelerating field at a reference value representative of the expected maximum amplitude value at resonance. Means are also provided to sense the variations in the temperature of the linear accelerator and to control the frequency of the magnetron so as to compensate for the variations in the resonant frequency of the accelerator that result from temperature induced changes in the length thereof.

The present invention pertains to the logging of earth formations by the use of logging instruments that have sources of high intensity nuclear radiation and that are passed through a borehole traversing the earth formation of interest, and, more specifically, to methods and apparatus for logging in which the source of high intensity nuclear radiation is capable of being pulsed and produces a burst of either photons or neutrons that has a continuous energy spectrum.

The term "nuclear radiation" has been used throughout the present application to mean a stream of particles, such as electrons, neutrons, protons, alpha particles, high energy photons or a combination of these.

Previously, photon sources used for logging purposes have included radioactive isotopes such as radium 226, cesium 137 or cobalt 60. Such isotopes are convenient to use, but they have several significant shortcomings: (1) The energy range of emitted photons is limited; (2) the maximum activity that can be safely and conveniently handled in field operations is limited to a few curies; (3) the isotopes are continuously emitting, so timing measurements are not possible, and (4) they emit photons uniformly in all directions. Furthermore, during logging operations, logging instruments are sometimes lost or become lodged in the borehole and, when the instrument includes a continuously emitting isotope source, the personnel involved in recovery operations are exposed to a substantially increased risk of radiation exposure and ground water supplies are in much greater danger of being contaminated.

Neutron sources presently used in logging operations are either isotopic, such as plutonium 238-beryllium or californium 252, or neutron generators that produce high energy 14.7 MeV neutrons by the reaction of deuterium on tritium. The isotopic sources are limited in the maximum output which can be safely handled and, as they emit neutrons continuously, they cannot be used for timing measurements. Neutron generators, such as that disclosed in U.S. Pat. No. 3,461,291, issued to Goodman on Aug. 12, 1969 and assigned to the assignee of the present invention, and which use an electrostatic ion accelerator to bombard a tritium target with deuterium ions, can be pulsed and therefore can be used for timing measurments, but the neutrons produced thereby are substantially monenergetic at the 14.7 MeV level and are not at the optimum energy for all logging purposes.

For logging purposes, therefore, previously used sources of nuclear radiation have had one or more of the following disadvantages: they have been intensity limited by safety considerations; they have had limited energy spectrum capabilities thereby limiting their usefulness, or they have been incapable of pulsed operation thereby limiting the measurements that could be taken.

In order to avoid confusion, the term "photon" has been used throughout the present application to mean high frequency electromagnetic radiation regardless of origin. Therefore, the term is meant to include gamma rays, X-rays and Bremsstrahlung, each of which consist of high frequency electromagnetic radiation but are classified, in general, by the way in which they are produced.

SUMMARY OF THE INVENTION

It is, therefore, an object of the present invention to provide a method and apparatus for logging an earth formation of interest using a source of high intensity nuclear radiation that can easily be converted between photon and neutron production and that can produce nuclear radiation in a wider range of energy values than heretofor possible.

It is a further object of the present invention to provide a method and apparatus for logging an earth formation of interest using a high intensity photon source that has substantially higher intensity than the isotopic photon sources presently used and that can be turned off when not in use.

It is a still further object of the present invention to provide a method and apparatus for logging an earth formation of interest using a high-intensity neutron source that has a broad energy spectrum in an energy range below 14.7 MeV and that has a pulse width narrower than available from present borehole generators to permit new or more precise timing measurements.

This is a continuation, of application Ser. No. 580,071, filed May 22, 1975, now abandoned.

There is provided, therefore, in accordance with the present invention, a well logging sonde including a linear particle accelerator for accelerating bursts of charged particles to high energy levels and means for controlling the accelerator driving energy source in response to variations of at least one condition of the accelerator, such as the temperature or the accelerating field. The high energy charged particles are used to bombard one or more targets to emit bursts of nuclear radiation that penetrate the surrounding media. Thereafter, indications of nuclear radiation resulting from the interaction of the emitted radiation and the surrounding media are obtained.

More particularly, the sonde of the present invention includes a microwave linear particle accelerator which is preferably a standing wave type and is excited by a microwave generator. Means are provided to sense the variations in the temperature of the accelerator and to adjust the frequency of the microwave generator so as to compensate for the variations in the resonant frequency of the accelerator that result from temperature induced changes in the length thereof. Means are also provided to sense the variations in the amplitude of the microwave field in the accelerator and to control the frequency of the microwave generator so as to maintain the amplitude of the accelerating field at a reference value representative of the expected maximum amplitude value at resonance. The energy of the accelerated particles is thus maintained at a maximum value.

The sonde of the present invention can include a photon emitting target or a neutron emitting target, but it preferably includes both. The neutron emitting target is positioned on the path of the accelerated particles, whereas the photon emitting target is positioned away from said path. In that case, means are provided for deflecting the bursts of high energy particles toward the photon target. Thereby a single logging sonde is capable of performing a large number of different logging techniques, depending on the energy, intensity and type of radiation emitted and the type of radiation which is detected.

In operation, the high energy charged particles strike a target and produce high intensity nuclear radiation at energy levels that are at an optimum for logging purposes and that minimize, therefore, the problems of penetration of the media surrounding the borehole.

BRIEF DESCRIPTION OF THE DRAWING

Further objects and advantages of the present invention will be apparent and a better understanding of the invention will be gained from a consideration of the following description of the preferred embodiments, taken in conjunction with the appended figures of the drawing, in which:

FIGS. 1A and 1B are representational views in longitudinal section showing a logging instrument in accordance with the present invention that is traversing a borehole;

FIG. 2 is a graphical representation illustrating typical photon spectra emitted by a logging instrument in accordance with the present invention;

FIG. 3 is a graphical representation illustrating typical neutron spectra emitted by a logging instrument in accordance with the present invention;

FIG. 4 is a representational view in longitudinal section showing one embodiment of a logging instrument in accordance with the present invention;

FIG. 5 is a representational view in longitudinal section showing another embodiment of a logging instrument in accordance with the present invention;

FIG. 6 is a representational view in longitudinal section showing a further embodiment of a logging instrument in accordance with the present invention; and FIG. 7 is a representational view in longitudinal section showing a still further embodiment of a logging instrument in accordance with the present invention.

DESCRIPTION OF THE PREFERRED EMBODIMENTS

Referring to the drawings, a well logging instrument in accordance with the present invention is shown in FIGS. 1A and 1B and includes a fluid-tight housing 10 adapted to be suspended in a borehole 11 that traverses earth formation 12. The borehole may be either cased, as represented by casing 13 and cement annulus 14, or uncased, and it may be filled with a drilling mud or other fluid 15. Suspension and vertical movement of the housing 10 is controlled by an armored cable 16, which extends to the earth's surface and passes over a winch 17 provided with a commutating arrangement (not shown) allowing electrical signals to be transmitted between the instrument and surface equipment. The housing 10 is urged against the casing by a conventional eccentering means such as a bow-string or a spring-loaded hydraulic system 18.

The instrument includes an upper electron acceleration and radiation generating section and a lower radiation detection section that are separated by a shield 19, shown in FIG. 1B. As will be further explained hereinafter, the shield may be fabricated of any material appropriate to prevent unacceptable levels of nuclear radiation from reaching the detection section.

In the upper section, a broad energy spectrum of photons or neutrons is produced by bombarding an appropriate target with a beam of high-energy electrons. Referring to FIG. 1B, the electrons are produced by a variable intensity source 20 and are accelerated in a microwave linear particle accelerator 21, which is preferably a standing wave type, operating in a $\pi/2$ mode and is excited by a microwave generator or magnetron 22 through a waveguide 23. A power supply network 24, shown in FIG. 1A, is provided to supply the required power to the various components of the logging instrument.

As shown in FIG. 1B, the linear accelerator 21 includes a beam injection cavity 25 and a number of substantially identical accelerating cavities 26 successively arranged along the accelerator axis 27 for electromagnetic interaction with the injected beam to accelerate the electrons to nearly the velocity of light. Depending on the operating frequency chosen, the energy gain of the accelerated electrons may be approximately 660 KeV per cavity and the length of each accelerating cavity may be approximately 2 inches. Thus, to obtain electrons accelerated to an energy of approximately 20 MeV, thirty cavities are needed with a total accelerator length of approximately 5 feet. Furthermore, electrons of any desired energy may be obtained by varying the number of accelerating cavities 26. The accelerating cavities 26 have a generally annular configuration about the axis 27, and the injection cavity 25 is equivalent to one-half of an accelerating cavity with the accelerator end wall 28 located at the midpoint and defining the upstream end of the accelerator 21. Such an injection cavity configuration is not required, but is advantageous since it results in the electrons being injected into the accelerator at the point of maximum electric field strength of the cavity (see Knapp et al, Standing Wave High Energy Linear Accelerator Structures, 39 *Review of Scientific Instruments*, No. 7, 979–991, July 1968). Throughout the length of the accelerator, adjacent cavities communicate through short cylindrical apertures 29 that are concentric with the axis 27.

A number of coupling cavities 30 are located along the accelerator for electromagnetic coupling of adjacent pairs of accelerating cavities 26. To obtain a symmetrical structure, the coupling cavities 30 are positioned along diametrically opposed sides of the accelerator in an alternating fashion between pairs of accelerating cavities 26. Each coupling cavity 30 has a cylindrical shape, the axis of which is parallel to the axis 27, and a central narrowing 31 intended to capacitively load the coupling cavity 30. As shown in FIG. 1B, each cylindrical coupling cavity 30 is positioned so that the innermost surface intersects the inside wall of the two adjacent accelerating cavities 26 to form inductive coupling irises 32 that provide a path for wave energy communication from one accelerating cavity 26 to the associated coupling cavity 30 and then to the adjacent accelerating cavity 26. The injection, accelerating and coupling cavities are all tuned to approximately the same frequency, which establishes the electron energy gain per cavity and for the energy gain given above is approximately 6 GHz.

Referring to FIG. 1B, end wall 28 includes a central beam entrance hole 33 and forms an accelerating electrode for the electron source 20. The source 20 is located inside a chamber, one wall of which is end wall 28, and includes an electro-emissive cathode 34 facing entrance hole 33 and a grid or extraction electrode 35, which is interposed between the cathode 34 and hole 33 at a very short distance from the cathode. The cathode 34 is connected to the output of a monostable circuit 36 delivering a 1 μsec negative voltage pulse of, typically, 4 KV when triggered by a starting pulse on conductor 37.

The starting pulses may be produced at the earth's surface by control circuits 38A (FIG. 1A), either automatically or by an operator, or they may be produced by downhole circuitry, as will be further discussed hereinafter. Each starting pulse is applied to monostable 36 through a variable delay line 38, the function of which will be explained hereinafter. Cathode 34 is also connected, through an inductance 39 and by way of conductor 40 to the positive output of a DC source 41 of, for example, 2 KV provided in the power supply network 24. The grid 35 is connected to the negative output of a high voltage DC supply 42, which is also connected by way of conductor 43 to the negative terminal of the DC source 41. To vary the intensity of the electron beam supplied to the accelerator 21, as will be explained below, the output level of the monostable 36 may be varied, for example, between −2 and −6 KV, by a control signal sent from the surface control circuits 38 on conductor 44.

The variable intensity electron source 20 operates as follows. When the output level of the high voltage supply 42 is, for example, −30 KV and no starting pulse is applied to the monostable 36, the cathode 34 and the grid 35 are at −30 KV and −32 KV, respectively. Although the end wall 28, which acts as an anode, is grounded, electrons from the cathode will not be attracted to the anode since the grid is negative with respect to the cathode. However, when the monostable 36 is triggered by a starting pulse and produces 1 μsec, −4 KV pulse, the potential of the cathode 34 drops to −34 KV, so that a burst of electrons of a given intensity is injected into the accelerator 21. If the pulse voltage is made more negative, i.e., decreased, in response to a control signal on conductor 44, the intensity of the electron burst will increase; conversely, if the pulse voltage is increased by the control signal, the intensity of the burst will decrease.

The emission end wall 45 of the accelerator 21 includes a beam output window 46 that is sealed with a material transparent to the beam of high energy electrons, such as a thin layer of aluminum foil. The electron source 20 and the accelerator 21 are evacuated to a low pressure (typically $10^{-6}$ torr) by means of a high vacuum pump when the source and accelertor are assembled, and the vacuum is maintained by at least one ion pump 47, which may be connected to the source 20. Suitably, pump 47 is energized through conductor 48 from a high voltage DC output 49 provided in the power supply network 24. To attenuate the earth's magnetic field, the accelerator 21 is surrounded by a foil of μ-metal 50 that, typically, has a thickness of 2 mm and provides sufficient attenuation to make the accelerator insensitive to the earth's magnetic field.

The accelerator 21 is excited with microwave energy from the magnetron 22 that operates in a frequency range covering the resonant frequency of the cavities. The magnetron is, advantageously, of the tunable, coaxial, multi-cavity type, in which a cylindrical cathode 51 is surrounded by a concentric annular anode 52 with a number of cavities 53 opening into the anode-cathode space, called the interaction space. An external magnetic field, with flux lines parallel to the axis of the cathode 51, is provided by a number of permanent magnets 54. The cathode 51 is connected by conductor 55 to a pulse forming network 56, described in detail hereinafter and shown in FIG. 1A, which delivers a negative voltage pulse of, for example, 40 KV when triggered by the starting pulse on conductor 37 that is applied to control input 57 of network 56. Power is coupled out of the magnetron 22 by means of the waveguide 23, which is connected directly to one of the anode cavities 53, and injected into the central accelerating cavity 26 of the accelerator 21 through a microwave window 58. Depending on the energy output of the magnetron or the number of accelerating cavities to be excited, a number of magnetrons with outputs that are in synchronism may be used, each with its own waveguide coupling to a separate accelerating cavity.

In the magnetron pulse forming network 56, a positive DC voltage, for example, 4 KV, supplied by power supply network 24 at output 59, is applied to a charging choke 60, which may consist of a number of inductances connected in parallel. The choke output is applied to a radio frequency (RF) suppressor circuit 61, which may include one or more inductances and resistances connected in parallel. The RF suppressor circuit output is applied to the anode of a silicon controlled rectifier or SCR 62, which has its cathode grounded and its gate electrode connected to the control input 57, and the input of a lumped equivalent transmission line 63, which may consist of a number of inductances 64 and capacitors 65 connected as shown in FIG. 1A. The output of the line 63 is applied to the primary of an output transformer 66 with the secondary windings energizing the cathode 51 of the magnetron by way of conductor 55.

The operation of the above described pulse forming network 56 is as follows. If no starting pulse is applied to the control input 57, the SCR 62 is blocked and capacitors 65 of the equivalent transmission line 63 are charged from output 59 through current limiting charging choke 60 and RF suppressor circuit 61. When a starting pulse is present on conductor 37 and applied to input 57, the SCR 62 becomes conductive and, in effect, grounds the transmission line 63 at that point. The characteristics of the equivalent transmission line 63 are such that capacitors 65 discharge successively through the transformer 66 primary, the first to discharge being the capacitor that is closest to the SCR 62 and the last to discharge being the capacitor 65 that is closest to the transformer 66 primary. The RF suppressor choke 61 prevents a pulse from the discharging transmission line from damaging the power supply 24. Assuming a turns ratio in the transformer 66 of 1:10 and an input voltage of 4 KV, a 40 pulse of suitable polarity is thereby obtained for application to the cathode 51 of the magnetron. The length (i.e., the number of components) of the transmission line may be adjusted to produce a pulse to the magnetron that has the desired duration, suitably 2 μsec. When the proper pulse is applied to the cathode 51, the magnetron 22 oscillates at its resonant frequency and the microwaves are applied to the accelerator 21 by way of waveguide 23.

Two different tuning systems are provided for adjusting the resonant frequency of the magnetron 22 (see Reich, *Microwave Theory and Techniques,* Van Nostrand Co., N.Y. 1953). The first tuning system, which is of the electronic type, is responsive to an error signal representative of the difference between the amplitude of the standing microwave field in the accelerator 21 and a reference value representative of the expected maximum amplitude value at resonance. More precisely, the amplitude of the field in the accelerator is sensed by means of a coupling loop 67 located in one of the coupling cavities 30. The loop is connected to an averaging and comparison circuit 68 for comparing the averaged amplitude to the reference value and producing an error signal, which is applied to the electronic tuning system 69. This system changes the resonant frequency of the magnetron by injecting into its interaction space a number of electrons from an auxiliary cathode 70 that is determined by the error signal. Thereby, the frequency of the microwave field in the accelerator 21 can thus be maintained at the resonant value and the energy of the accelerated electrons is maintained at a maximum value.

The second tuning system, which is of the mechanical type, is responsive to a second error signal representative of the difference between the temperature of the accelerator 21 and a reference temperature. This system is intended to compensate for the variations in the resonant frequency of the accelerator that result from temperature induced changes in the length of the accelerator. The accelerator temperature is sensed by means of a thermocouple 71 that is in contact with the external wall of the accelerator. The thermocouple output is applied to a comparison circuit 72 that produces an error signal for use by a mechanical tuning system 73, which includes a servomechanism, that changes the frequency of the magnetron by modifying the position of a conducting rod 74 inserted into one of the anode cavities 53 a distance that is determined by the error signal. The frequency of the microwave accelerating field is thus dependent on the temperature in the borehole in such a way that resonance is maintained between the magnetron and the accelerator cavity, the dimensions and, therefore, the resonant frequency of which are temperature dependent. The output from thermocouple 71 may also be used to adjust the reference value in comparison circuit 68 of the first tuning system.

The operation of the accelerator 21 is initiated by a starting pulse, which is sent on the order of 200 times per second through conductor 37 and is first received at the control input 57 of the pulse forming network 56. The magnetron 22 is excited and a resonant microwave field is established in the accelerator 21. At the end of the delay imposed by the line 38, which corresponds to the settling time (approximately 1 $\mu$sec) of the microwave field in the accelerator and the time necessary to synchronize the arrival of the electrons at the entrance hole 33 with the microwave field and which may be varied by an operator on the surface or as explained hereinafter, the starting pulse is received by the monostable 36. The electron source 20 is thus triggered and a burst of electrons enters the injection cavity 25 at the time of maximum amplitude of the microwave field, whereby the electrons are tightly bunched. As the bunched electrons ride the crest of the microwave field, moving at close to the speed of light, they gain energy continuously in the chain of accelerating cavities 26 and emerge from the beam output window 46 as a burst of electrons approximately 1 $\mu$sec long with an energy that depends on the number of accelerating cavities and the resonant frequency at which the accelerator is operated.

An indication of the intensity of the electron burst emerging from the accelerator 21, which may be used for control purposes and to adjust the delay 38 as described above, either automatically as shown or remotely by an operator at the surface, may be obtained by a ferrite core transformer 75 or other sensing means located along the beam near the output window 46. The transformer may be coupled to an amplifier 76, which produces a signal related to the burst intensity on conductor 77 so that it may be transmitted to the surface where it may be displayed and recorded, for example, by meter 78 and recorder 79.

Selection of the type of nuclear radiation to be produced may be easily and readily accomplished by use of an electromagnet 80 or other beam deflection means energized from a synchronously pulsed or DC current supply 81. The electromagnet applies a magnetic field perpendicular to the beam of high energy electrons emerging from the accelerator 21 that deflects the beam through some angle $\theta$, say 45°, toward a target 82 that emits photons when bombarded by electrons. The target may be of any suitable material, such as tungsten, as is well-known in the art. At such high incident energy values, the photon bursts emitted by the target emerge from the instrument in a predominantly forward direction relative to the incident electrons and enter the formation 12. Therefore, shielding of the detector section from the photons thus produced is not a significant problem. In order to minimize beam losses in the logging instrument, however, a window 83, which is fabricated of a material that is transparent to the photons so produced, may be provided.

With an accelerator in accordance with the present invention, photons can be produced with energy values and intensity levels significantly above those possible with presently known isotopic borehole sources. For example, present logging instruments are limited by practical considerations to isotopic sources with a strength of a few Curies while an accelerator as described herein is capable, with an electron beam strength of 100 watts at 5 MeV, of emitting photons with an energy flux equivalent to approximately 72,000 Curies of cesium 137. Furthermore, the spectrum of photons produced, as shown in FIG. 2, is a broad spectrum with an end point energy that is high as compared to isotopic sources. Although the curves shown in FIG. 2 are normalized to simplify comparisons between photon production at various incident electron energies, it is apparent from the curves that the broad spectrum of produced photons extends from an energy that approaches zero up to an end point energy value that approaches the energy of the incident electrons, whether the incident energy be 5, 10 or 20 MeV.

To control the source 81 that energizes the deflecting electromagnet 80, a signal from either the surface control circuits 38 or from downhole control circuitry on conductor 84 can be used. For example, it may be desirable to de-energize electromagnet 80 between electron bursts from the accelerator in order to conserve downhole power, and, in that event, electromagnet 80 may be normally de-energized with a signal on conductor 84 being used to energize source 81, perhaps in co-incidence with a starting pulse on conductor 37.

For neutron production, a second target 85 is provided and positioned in the logging instrument so that when the deflecting field of electromagnet 80 is not present, the electron beam will emerge from the accelerator and bombard the neutron target. To convert the accelerator to neutron production, therefore, it is necessary merely to omit a signal in conductor 84 when neutrons are desired so that the deflecting field is not present and the electrons strike the target 85. This target may be of any material, such as beryllium, suitable for the production of neutrons when impacted by high energy electrons.

One significant advantage of an accelerator used to produce neutrons in accordance with the present invention is that neutron bursts of extremely short duration are possible. Present pulsed neutron sources, in addition to producing neutrons in an energy range that is not the optimum for most logging purposes, produce neutrons in bursts that last between 5 and 10 $\mu$sec. Since the electron burst output of an accelerator as disclosed herein has a duration of the order of 1 $\mu$sec, neutron bursts of that duration are obtainable and are useful as will be described hereinafter.

The spectrum of neutrons thus produced will be a broad, fission-like spectrum, as shown in FIG. 3, that will have an energy distribution with a peak centered about an energy that is dependent on the energy of the incident electrons. Curve A in FIG. 3 represents the expected production of neutrons from an accelerator in accordance with the present invention by bombarding a thin target of beryllium with a burst of electrons having an energy of approximately 5 MeV. The curve is shown truncated at approximately 3.4 MeV due to the threshold energy of 1.6 MeV necessary to free a neutron from a beryllium nucleus. If the accelerator 20 produces a burst of electrons having an energy of approximately 20–25 MeV, the expected energy distribution of the emitted neutrons will be as shown in curve B of FIG. 3. Regardless of the energy of the incident electrons, however, the spectrum of neutrons is a broad and continuous spectrum, particularly when compared to the range of energy values of neutrons produced by presently known pulsed neutron sources, which is represented as a single spike at 14.7 MeV.

The neutrons produced in accordance with the present invention will be emitted isotropically from target 85 and it will be necessary, therefore, for shield 19 to be fabricated of a material, such as sintered tungsten, that is particularly effective in absorbing neutrons to prevent the detection section from being irradiated. With an accelerator in accordance with the present invention, a neutron flux of between $10^9$ to $10^{11}$ neutrons per second may be obtained, a value that is very high compared with the flux of 0.5 to $5 \times 10^8$ neutrons per second now obtainable in present neutron logging instruments with known isotopic or pulsed neutron sources.

Selected radiation returning to the borehole from the photon or neutron irradiation of the formation is detected in the lower section of the instrument, as will be described in greater detail hereinafter. Regardless of the logging method in use, however, the detection section will include at least one nuclear detector 86, which is exposed to the radiation through a window 87 in the side of the housing 10. The electrical output from the detector 86 is applied to an amplifier 88 and then, if passed by linear gate 89 as explained below, to a downhole pulse processing and transmission circuit 90 that conditions and transmits the signal to the surface through cable 16. At the surface the signals are received in a cable interface and pulse processing circuit 91 that distinguishes the signals from electrical noise and reconditions the pulses before applying them to computer 92 which is appropriate to the method of well logging in use, and to display and recording devices 93 and 94, respectively.

Transmission of the pulses from downhole pulse processing and telemetering circuits 90 to the surface to processing and cable interface circuits 91 may either be by individual conductors dedicated to a specific detector or, in view of the high count rates involved and the probable use of more than one detector, preferably by a multiplexed pulse telemetering system such as that disclosed in U.S. Patent Application, Ser. No. 563,507 now U.S. Pat. No. 4,012,712 of Nelligan for "System for Telemetering Well Logging Data", filed Mar. 31, 1975 and assigned to the assignee of the present application.

Linear gate 89 is used to minimize the detection of background gamma radiation and to make possible timed logging measurements and may be enabled to pass pulses from detector 86 by use of any appropriate control signal, such as the burst intensity signal on conductor 77. When the accelerator electron beam causes a burst intensity signal to be produced, gate 89 will be enabled, perhaps after a suitable delay and for a selected time period, to allow radiation to enter and interact with the earth formation and for radiation resulting from that interaction to return to the borehole to be detected.

When a linear electron accelerator source as described above, a number of new or improved logging applications are possible.

For example, if the incident particle on the earth formation of interest is a photon, one logging technique that is significantly improved in accordance with the present invention is density logging, as it is known, which makes use of the Compton scattering effect. As is well-known, the Compton effect is the scattering of a photon by a free electron. In the process the photon loses energy to the electron and is altered in direction. The Compton effect for any given atom, therefore, is the additive affect of all its electrons, and the probability for Compton scattering to occur is determined by the electron density, which depends in turn on the bulk density of the earth formation.

Prior density logging devices have included one or more photon detectors to count the photons scattered back to the borehole at various distances from the source, the count rate of detected photons being indicative of the earth formation density. Furthermore, as indicated above, prior density logging instruments have been limited, by safety considerations, to photon sources with an activity of a few Curies.

In accordance with the present invention, however, an improved logging instrument 95 is shown in FIG. 4 in a borehole that has a casing 96 surrounded by a cement annulus 97 between the instrument 95 and the earth formation 98. The instrument 95 includes a linear accelerator source 99 as described hereinabove that emits a very high intensity beam of photons 100 with an end point energy that is high as compared to isotopic sources.

Instrument 95 also includes one or more detectors 101, which may be, for example, semiconductor detectors or scintillation crystal/photomultiplier tube detectors, for detecting photons scattered back to the logging instrument and producing pulses representative of the detected photons. Pulses from the detectors are amplified in preamps 102 and, when passed by linear gates 103 as described above, are transmitted to the surface according to presently known techniques. At the surface, pulses from the two detectors may be processed to obtain formation density as shown in U.S. Pat. No. 3,321,625, issued May 23, 1967 to Wahl and assigned to the assignee of the present application or, more recently, as shown in the density computer described in U.S. Pat. No. 3,590,228, issued June, 29, 1971 to Burke and also assigned to the assignee of the present invention. If desirable, the density computer output and/or the detector pulses may be recorded on tape recorder 104 for processing at a location remote from the borehole.

With the linear accelerator source of the present invention, counting rates at detectors 101 will increase significantly over the isotopic source prior art logging instruments, thereby permitting larger source to detector spacings than heretofore possible for improved depth of investigation as well as permitting higher logging speeds for the instrument 95. Both results are highly advantageous in commercial logging operations. For example, as a direct result of the higher intensity of the linear accelerator source, the source to detector spacing may be doubled without a loss in count rate, thereby roughly doubling the depth of investigation into the earth formation.

Another logging technique which will benefit by the use of a source of photons as described herein is lithology logging, which makes use of the photoelectric effect to derive an effective atomic number for an earth formation.

A logging instrument arranged for lithology logging might be similar to that shown in FIG. 4 except that the photons detected by each detector 101 would be separated by a pulse height analyzer into at least two energy ranges. A ratio of those ranges would then be taken in order to "normalize" the signal, that is, in order to remove the effects of density and other disturbing influences such as mudcake and cement annulus on the lithology informaton (see U.S. Pat. No. 3,864,569, issued Feb. 4, 1975 to Tittman and assigned to the assignee of the present application). It is clear, therefore, that the increased counting rates resulting from a linear accelerator source in accordance with the present invention would benefit a lithology type measurement in the same way that it benefits density type measurements.

When beam 100 is a very high intensity beam of photons with, for example, a 3–5 MeV end point energy, another logging technique based on the Compton scattering approach becomes feasible. The beam can be thought of as being made up of a number of components each defined by a range of energies, say 0.5 MeV, giving the beam a total of 10 components. The lowest component, that is the 0 to 0.5 MeV component, would begin diffusing through large angle Compton scattering almost immediately; the second component would penetrate a little further into the formation before losing enough energy through small angle Compton scattering to begin diffusing back to the borehole; the third component would penetrate still further before diffusing back to the borehole, and so on up to the tenth component.

To take advantage of the density information that can be extracted from each of these beam components, a source-detector arrangement such as shown in FIG. 5 may be used. Photon beam 105 is the very high intensity beam described above and is produced by linear accelerator 106. Detectors 107, which advantageously are small in size and efficient in operation, are spaced along the instrument generally as shown. Since the beam 105 is continually diverging from the borehole, contiguous detectors receive information from a particular contiguous component of the emitted photon beam, and, since the higher energy components of the beam penetrate more deeply into the formation, the detectors furthest from the source would receive scattered photons giving density information from deeper within the formation than the nearer detectors.

Each of the detectors 107 produces a signal representative of a detected photon that is amplified in preamplifier 108 and controlled by linear gates 109, which may be opened by a signal derived from the beam intensity signal, as described hereinbefore, in order to coordinate the detection period with the emission of the photon beam 105.

At the surface, the count rate from each of the detectors 107 may be compared with one another, thereby to measure density variations along the length of the earth formation traversed by the beam 105 to provide a density profile, that is, to provide an indication of density changes with increasing depth from the borehole into the earth formation. Such a density profile may be used, for example, to give an indication of formation permeability by locating the boundary of a flushed zone.

Regardless of the transmission system used to transmit pulses from detectors 107 to the surface of the earth, it will be desirable to accumulate the counts representative of detected photons for each detector so that density measurements derived for each depth of investigation (i.e., for each detector) will be derived for the same depth levels along the axis of the borehole. If, for example, the above identified Nelligan telemetering system is used, sufficient memory addresses will be provided for each detector so that the counts recorded after each burst of the source 106 will be accumulated in a memory before being transmitted to the surface. At the surface, the processed pulses are depth correlated in a standard depth memorizer 110, which operates at a speed controlled by winch 17 so that accumulated counts from the detectors 107 are all at the same depth in the borehole and the density profile output from the computer, which may be obtained according to the disclosure of the Wahl and Burke patents identified above, is also correlated to the same depth levels along the borehole axis.

Another logging technique possible with the linear accelerator source disclosed herein is represented in FIG. 6, which shows apparatus for logging an earth formation making use of the pair production interaction to determine density information from the formation.

As is well known, the pair production process takes place when a high energy photon (for example, 20 MeV) disappears in the field of a charged particle and an electron-positron pair appears. The probability that the process will occur varies as the square of the charge of the target particle, which may be an atomic nucleus or an electron, and increases with an increasing energy of the incident photon. It is also well known that at high energies the electron-positron pair produced by the photon would each tend to be traveling in a forward direction and, given a photon of 20 MeV, would each make an angle of approximately 1.5 degrees with the original photon direction, so that the photon beam initially has a very small divergence. The electrons and positrons thus produced may radiate a photon (i.e. produce Bremsstrahlung) as they decelerate while passing through the earth formation. Thus, the process may begin all over again and be repeated until photon energy values drop below pair production threshold levels. Due to the regenerative nature of the process, much greater penetration of the earth formation results than might ordinarily be expected from photons in the 20 MeV range. The positron thus produced annihilates itself, usually upon coming to rest, by combining with an electron and producing two 511-KeV photons that head off back-to-back in a direction which is random with respect to the incident beam direction.

Since the photon beam emitted by the accelerator contains photons with energies that vary from 0 up to the incident electron kinetic energy in the accelerator, the generation of annihilation 511 KeV photons occurs all along the photon beam out to approximately 20-30 centimeters after the beam's emergence from the logging instrument, assuming an end-point energy of 20-25 MeV.

Accordingly, FIG. 6 shows a linear accelerator source 111 within a logging instrument 112 that is emitting a beam of photons 113 of approximately 20 to 25 MeV. As described above, the photon beam 113 may be viewed as being made up of a number of components and, therefore, even though the end point energy of the beam 113 is approximately 25 MeV there are some photons emitted by the accelerator 111 that are less than 2 MeV. These photons are in an energy range in which Compton scattering is the predominant reaction and they would, therefore, begin large angle Compton scattering shortly after emission from the instrument 112. Instrument 112 also includes one or more detectors 114 and their associated preamplifiers 115 and gates 116, all of which operate as described in connection with the instrument shown in FIG. 4. Photons included within beam 113 that have energies exceeding 2 MeV, however, will penetrate more deeply into the formation producing pairs of annihilation 511 keV photons all along its path as represented by the dotted line 113. Beyond some point, represented qualitatively by 117, the incident beam can be thought of as consisting of an isotropic source of 511 keV annihilation quanta linearly disposed along the beam direction up to 20-30 centimeters from its emergence from the sonde housing. Spaced from detectors 114 is at least one additional photon detector 118, which is positioned and adjusted in the instrument to detect 511 keV photons that are emitted in the direction of the borehole. Detector 118 also has its associated preamplifier 119 and gate 120, which operate as described for previous embodiments.

The counting rate, N, of detector 118 is proportional to the source intensity divided by the formation attenuation:

$$N = N_o e^{-\mu \rho x} \quad (1)$$

where $N_o$ is the initial intensity, $\mu$ is the mass absorption coefficient for 511 keV photons in the formation medium, $\rho$ is the density and $x$ is the distance from the detector to the source in the formation (remembering that the 511 keV photons are produced by essentially a line source existing in the formation). Since $x$ and $\mu$ are known, and $N_o$ is proportional to the photon intensity, which can be determined, density $\rho$ can be determined.

Alternatively, a ratio of counting rates from detectors 1 and 2 is given by:

$$\frac{N_1}{N_2} = e^{-\mu \rho (x_1 - x_2)} \quad (2)$$

where $x_1$ and $x_2$ represent the average distances from the source to the detector for the two detectors. Thereby, the need to know the photon source intensity is eliminated. If there is an intervening layer of mudcake, casing or cement, a ratio as described above in equation (2) also eliminates the effect of the intervening layers traversed by the photons provided that the photons detected in both detectors traverse the same intervening layers. To further improve the depth of investigation sensitivity of the pair production-Compton scattering logging instrument shown in FIG. 6, the detectors may be collimated, as indicated generally at 121 and 122, to limit the directions from which incident photons can be detected.

As with the apparatus shown in FIG. 5, the apparatus disclosed in FIG. 6 may be modified to include three or more detectors 118 to provide a profile of density versus depth in the formation. Such a profile is especially of interest if the material adjacent to the logging instrument consists of several intervening layers such as casing, cement, residual mudcake, and an altered formation zone in front of the virgin formation.

When the linear accelerator source described herein is configured to produce neutrons, increased counting rates and/or increased logging speeds for presently known logging techniques will be realized, since the intensity of the neutron burst produced by the linear accelerator is significantly higher than isotopic or previously known pulsed neutron sources (4 or 5 $\times$ 10$^8$ as compared to approximately 10$^9$ to 10$^{11}$ for the source described herein) and since the energy level of the neutrons produced by present neutron generators is far from the optimum energy level for most logging purposes (it takes time for the 14 MeV neutrons to slow down to epithermal and thermal levels so that they or the results they produce can be measured with some degree of efficiency).

For example, in one logging technique for porosity determinations, fast neutrons are emitted from an isotopic source into the earth formation and are slowed down by collisions with the nuclei of the formation until they reach thermal equilibrium with the nuclei. The logging instrument includes one detector and since the primary interest in the logging technique is to determine the porosity of the formation (i.e., the hydrogen density), the slowing down time properties of the formation may be determined by detecting epithermal neutrons in the formation. That is, the counting rate of epithermal neutrons will be determined principally by the hydrogen density of the formation. Due to the increased intensity of emitted neutrons from the neutron source described herein, increased counting rates are experienced, which may be used to improve the reliability of present measurements either by permitting an increase in the shielding against thermal neutrons and the source to detector spacing, or by increasing the logging rate of the instrument; both alternatives being valuable commercial considerations.

Another form of neutron logging for porosity determination involves the use of an isotopic source and two neutron detectors at different spacings from the source. Depending on the particular logging instrument, the detectors may be capable of detecting either epithermal or thermal neutrons. The detector with the closest spacing to the neutron source is used essentially to compensate the porosity determination by the far spacing detector for borehole and mudcake effects.

Shown in FIG. 7, is a logging instrument 123 configured as a two detector porosity logging instrument and including a linear accelerator source 124 producing neutrons in accordance with the present invention that are emitted into earth formation 125. The spectrum of emitted neutrons may be, as described above, a fission like spectrum with an energy distribution peak centered in the 1 MeV range. Logging instrument 123 includes two thermal neutron detectors 126; the detector nearest the source 124 being used, as indicated above, to compensate the far spacing detector for borehole and mudcake effects. Detectors 126 will also have associated therewith preamplifiers 127 and may include gates 128 for controlling the detection period for the individual detectors as described hereinbefore. As with the one detector porosity logging instrument described above, the principal advantages gained by the use of a linear accelerator with the instrument shown in FIG. 7 relate to improved count rates and increased logging speeds. Pulses from detectors 126, after being amplified and gated, will be transmitted to the surface, for example, as disclosed in the Nelligan application. At the surface, the pulse information will be used to derive porosity indications, in accordance with well-known techniques, for example, in accordance with the disclosure of the Burke patent.

Still referring to FIG. 7, a new logging technique is possible with the apparatus shown therein by taking advantage of the short neutron burst time of the linear accelerator relative to presently used pulsed neutron generators. By using gates 128 from one or more of the detectors to coordinate the detection period with the emission of fast neutrons into the earth formation, the slowing down time of the neutrons to some selected energy, for example, 1 eV, may be measured. Such a short burst period is necessary since the slowing down time of the fast neutrons to any selected energy level depends strongly on the amount of hydrogen in the formation; being as short as a few microseconds in water. The measurement is simplified considerably if the burst of neutrons is short compared to the slowing down time. To determine earth formation slowing down time in this way, gates 128 will be enabled by a control signal, such as described above, to pass pulses from one or more detectors 126 as the first neutrons are emitted into the earth formation. The detectors 126 will include a suitable filter, such as cadmium, to prevent neutrons having energies below the selected energy from reaching the detectors. The slowing down time would be the time necessary after the neutron emission for the first neutron to slow down to the selected energy and pass the filters to be detected. The slowing down time period could be recorded by using the control signal to start a clock, which would continue to produce clock pulses until stopped and reset by a signal from the detector being used for the measurement. The clock pulses could then be counted and transmitted as shown in the Nelligan application.

In addition to making porosity and neutron slowing down time determinations, instrument 123 may include one or more photon detectors 129 to detect capture photons produced in the earth formation 125 by the neutrons emitted from the logging instrument that have thermalized and diffused until captured by the earth formation nuclei. Signals from detector 129 after being amplified in preamp 130 and gated by linear gate 131, may be analyzed to indicate the energy of any incoming capture photon in order to perform a chemical analysis of the formation constituents (see U.S. Pat. No. 3,521,064 issued July 21, 1970 to J. H. Moran et al and assigned to the assignee of the present application). Furthermore, one of the neutron detectors 126 or the gamma ray detector 129 may be used to produce an output that is analyzed for time dependence in order to produce a thermal decay time log (see U.S. Pat. No. 3,566,116, issued Feb. 23, 1971 to W. B. Nelligan and assigned to the assignee of the present application).

In view of the ability to readily convert the linear accelerator source disclosed herein from photon to neutron production, it will be apparent to those skilled in the art that any one or more of the measurements in which photons are the incident particles may be combined with any one or more of the neutron incident particle produced measurements in one logging instrument by coordinating the detection periods with the deflection of the linear accelerator electron beam from the photon target to the neutron target.

Such detection period control may be accomplished, for example, by counting beam intensity pulses and switching either from one target to the next or from one detector to the next based upon a predetermined number of bursts for each detection period. Thereby, all of the desired measurements could be sequentially taken in a constantly repeating cycle as the logging instrument is advanced through the borehole. A detection period control such as that described could be used, in accordance with the present invention, for example, to combine one or more of the earth formation density determination configurations shown in FIGS. 4 or 5 with one or more of the porosity determination configurations described in connection with FIG. 7.

Although the invention has been described with reference to specific embodiments thereof, many other variations and modifications of the invention will be apparent to those skilled in the art without departing from the spirit and scope of the invention. The above described embodiments are, therefore, intended to be merely exemplary, and all such variations and modifications are intended to be included within the scope of the invention as defined in the appended claims.

We claim:

1. A method of logging the media surrounding a borehole that traverses an earth formation, comprising the steps of:
   accelerating charged particles to high energy levels in a number of individual cavities containing an accelerating field;
   controlling the acceleration of said particles in response to variations of at least one condition of said cavities;
   bombarding a target with the accelerated particles to emit nuclear radiation that penetrates the surrounding media; and
   detecting nuclear radiation returning to the borehole as a result of the interaction of the emitted radiation and the surrounding media.

2. The method of claim 1, wherein said condition is the temperature of the cavities.

3. The method of claim 1, wherein said condition is the accelerating field in the cavities.

4. The method of claim 1, wherein the radiation returning to the borehole is detected in a time-dependent manner.

5. A method of logging the media surrounding a borehole that traverses an earth formation, comprising the steps of:

repetitively producing bursts of charged particles;

accelerating said charged particles to high energy levels in a number of individual accelerating cavities;

controlling the production of said bursts of charged particles in response to variations of the intensity of the bursts of accelerated particles;

bombarding a target with the accelerated particles to emit nuclear radiation that penetrates the surrounding media; and detecting nuclear radiation returning to the borehole as a result of the interaction of the emitted radiation and the surrounding media.

6. The method of claim 5, further comprising the step of controlling the acceleration of said particles in response to variations of at least one condition of the accelerating cavities.

7. The method of claim 5, wherein the radiation returning to the borehole is detected in a time-dependent manner.

8. A method of logging the media surrounding a bore-hole that traverses an earth formation comprising the steps of:

accelerating charged particles to high energy levels in a number of individual accelerating cavities;

controlling the acceleration of said particles in response to variations of at least one condition of said cavities;

bombarding a first target with said high energy particles to emit photons that penetrate the surrounding media;

bombarding a second target with said high energy particles to emit neutrons that penetrate the surrounding media; and obtaining indications of nuclear radiation returning to the borehole as a result of the interaction of the emitted photons and neutrons with the surrounding media.

9. An apparatus for logging the media surrounding a borehole that traverses an earth formation comprising, within a pressure resistant housing adapted to pass through the borehole;

means for repetitively producing bursts of charged particles;

linear accelerator means, including a source of driving energy, for accelerating said bursts to high energy levels along a path generally parallel to the axis of the borehole;

means for controlling said driving energy source in response to variations of at least one condition of said linear accelerator means;

means responsive to bombardment by said high energy charged particles for repetitively emitting bursts of nuclear radiation that penetrate the surrounding media; and means for obtaining indications of nuclear radiation returning to the borehole as a result of the interaction of the emitted radiation and the surrounding media.

10. The apparatus of claim 9, wherein said controlling means responds to variations in the temperature of the linear accelerator means.

11. The apparatus of claim 9, further comprising means for controlling said producing means in response to variations of the intensity of said bursts of high energy particles.

12. The apparatus of claim 9, wherein said emitting means includes a photon emitting target.

13. The apparatus of claim 12, wherein said obtaining means includes at least one photon detector.

14. The apparatus of claim 9, wherein said emitting means includes a neutron emitting target.

15. The apparatus of claim 14, wherein said obtaining means includes at least one photon detector.

16. The apparatus of claim 14, wherein said obtaining means includes at least one neutron detector.

17. The apparatus of claim 9, wherein said emitting means includes:

a neutron emitting target positioned on the path of said high energy particles;

a photon emitting target positioned away from the path of said high energy particles; and means for deflecting said high energy particles toward said photon target.

18. The apparatus of claim 17, wherein said obtaining means includes at least one photon detector and at least one neutron detector.

19. An apparatus for logging the media surrounding a borehole that traverses an earth formation comprising, within a pressure resistant housing adapted to pass through the borehole:

means for repetitively producing bursts of charged particles;

linear accelerator means, including a microwave energy driving source, for accelerating said bursts to high energy levels;

means for sensing the variations in the temperature of said linear accelerator means;

means for controlling the frequency of said microwave source in response to said sensing means;

means responsive to bombardment by said high energy charged particles for repetitively emitting bursts of nuclear radiation that penetrate the surrounding media; and means for obtaining indications of nuclear radiation returning to the borehole as a result of the interaction of the emitted radiation and the surrounding media.

20. The apparatus of claim 19, further comprising:

means for sensing the variations of the microwave energy in said linear accelerator means; and means for controlling the frequency of said microwave source in response to said energy sensing means.

21. The apparatus of claim 20, further comprising:

means for sensing the intensity of said bursts of high energy charged particles; and means for controlling said producing means in response to said intensity sensing means.

22. An apparatus for logging the media surrounding a borehole that traverses an earth formation comprising, within a pressure resistant housing adapted to pass through the borehole:

means for repetitively producing bursts of charged particles;

linear accelerator means, including a microwave energy driving source, for accelerating said bursts to high energy levels;

means for sensing the variations of said microwave energy in the linear accelerator means;

means for controlling the frequency of said microwave source in response to said sensing means;

means responsive to bombardment by said high energy charged particles for repetitively emitting bursts of nuclear radiation that penetrate the surrounding media; and means for obtaining indications of nuclear radiation returning to the borehole as a result of the interaction of the emitted radiation and the surrounding media.

23. The apparatus of claim 22, further comprising:

means for sensing the intensity of said bursts of high energy charged particles; and means for controlling said producing means in response to said intensity sensing means.

24. An apparatus for logging the media surrounding a borehole that traverses an earth formation comprising, within a pressure resistant housing adapted to pass through the borehole;

means for repetitively producing bursts of charged particles;

linear accelerator means, including a microwave energy driving source, for accelerating said bursts to high energy levels;

means for sensing the intensity of said bursts of high energy charged particles;

means for controlling said producing means in response to said sensing means;

means responsive to bombardment by said high energy charged particles for repetitively emitting bursts of nuclear radiation that penetrate the surrounding media; and means for obtaining indications of nuclear radiation returning to the borehole as a result of the interaction of the emitted radiation and the surrounding media.

25. The apparatus of claim 24, further comprising:

means for sensing the variations in the temperature of said linear accelerator means; and means for controlling the frequency of said microwave source in response to said temperature sensing means.

26. An apparatus for logging the media surrounding a borehole that traverses an earth formation comprising, within a pressure resistant housing adapted to pass through the borehole:

means for repetitively producing bursts of charged particles;

linear accelerator means, including a microwave energy driving source, for accelerating said bursts to high energy levels;

means for synchronizing said producing means and said mircowave source;

means for sensing the intensity of said bursts of high energy charged particles;

means for controlling said synchronizing means in response to said sensing means;

means responsive to bombardment by said high energy charged particles for repetitively emitting bursts of nuclear radiation that penetrate the surrounding media; and means for obtaining indications of nuclear radiation returning of the borehole as a result of the interaction of the emitted radiation and the surrounding media.

* * * * *

UNITED STATES PATENT AND TRADEMARK OFFICE
CERTIFICATE OF CORRECTION

PATENT NO. : 4,093,854
DATED : June 6, 1978
INVENTOR(S) : Ronald E. Turcotte et al It is certified that error appears in the above-identified patent and that said Letters Patent are hereby corrected as shown below:

Abstract should read on last line -- induced changes in the length thereof. --

Col. 1, lines 6 through 22 should be deleted

Col. 2, lines 40 through 41 should be at Col. 1, line 6

Column 6, line 62, "40 pulse" should read -- 40 KV pulse --.

Col 20, line 31 should read -- returning to the borehole as a result of the interaction --.

Signed and Sealed this

Sixteenth Day of October 1979

[SEAL]

Attest:

RUTH C. MASON
Attesting Officer

LUTRELLE F. PARKER
Acting Commissioner of Patents and Trademarks